(12) United States Patent
Nolte et al.

(10) Patent No.: US 6,818,882 B2
(45) Date of Patent: Nov. 16, 2004

(54) DEVICE AND METHOD FOR CONTROLLING AND INTERCHANGEABLE CARTRIDGE FOR MICROSCOPES

(75) Inventors: Frank Nolte, Dransfeld (DE); Ralf Boecker, Goettingen (DE)

(73) Assignee: Carl Zeiss Jena GmbH, Jena (DE)

( * ) Notice: Subject to any disclaimer, the term of this patent is extended or adjusted under 35 U.S.C. 154(b) by 120 days.

(21) Appl. No.: 10/220,520

(22) PCT Filed: Oct. 2, 2001

(86) PCT No.: PCT/EP01/11370
§ 371 (c)(1),
(2), (4) Date: Dec. 4, 2002

(87) PCT Pub. No.: WO02/29466
PCT Pub. Date: Apr. 11, 2002

(65) Prior Publication Data
US 2003/0147087 A1 Aug. 7, 2003

(30) Foreign Application Priority Data
Oct. 6, 2000 (DE) ......................... 100 50 824

(51) Int. Cl.[7] .............................................. H01J 40/14
(52) U.S. Cl. ..................................... 250/221; 250/239
(58) Field of Search .............................. 250/221, 239; 360/92; 369/30.81, 30.31, 179; 414/932, 937, 938, 939

(56) References Cited

U.S. PATENT DOCUMENTS 5,469,310 A * 11/1995 Slocum et al. ............... 360/92
6,154,312 A   11/2000 Takahama et al.

FOREIGN PATENT DOCUMENTS

| DE | 37 11 843 | 9/1988 |
|----|-----------|--------|
| DE | 40 28 241 | 3/1992 |
| JP | 7-128573  | 5/1995 |
| JP | 11-095088 | 4/1999 |

* cited by examiner

*Primary Examiner*—Que T. Le
(74) *Attorney, Agent, or Firm*—Reed Smith LLP

(57) ABSTRACT

A method for controlling a changing magazine for microscopes which combines the simple principle of a catch with a "forward looking" operation having a determined traveling speed profile along path $v(x)$ which can be determined beforehand corresponding to the catch positions $x_j$ which are assumed to be known. Accordingly, the braking process can be initiated already before reaching the capture area, that is, before the catch signal is initiated. In contrast to the free positioning with a stepping motor or position-regulated driving device, no particular precision is required because the capture area of the catch mechanism is capable of compensating for greater tolerances.

25 Claims, 2 Drawing Sheets

DEVICE AND METHOD FOR CONTROLLING AND INTERCHANGEABLE CARTRIDGE FOR MICROSCOPES

CROSS-REFERENCE TO RELATED APPLICATIONS

This application claims priority of International Application No. PCT/EP01/11370, filed Oct. 2, 2001 and German Application No. 100 50 824.3, filed Oct. 6, 2000, the complete disclosures of which are hereby incorporated by reference.

BACKGROUND OF THE INVENTION a) Field of the Invention

Very high positioning accuracy is often required for switching optical components (objectives, reflectors, filters, etc.) arranged in changing magazines (nosepieces, slides, carriages or the like) in microscopes.

b) Description of the Related Art

Two principles are known for automatic, motorized switching:

1. Free positioning by means of a highly accurate drive, e.g., by a synchronous stepping motor with microstep control or by a drive that is regulated by a high-resolution position sensor. The individual switching positions are determined in advance so that they can be adjusted deliberately and quickly without further feedback (i.e., blindly) in an accelerating and braking process that is determined beforehand. In this connection, the strict requirements for the motor and gear unit, whose position resolution and reproducibility determine the positioning accuracy, are disadvantageous.

2. Positioning by means of a mechanical catch mechanism which, with the help of an energy accumulator (e.g., spring element), generates sufficient power within a determined capture area to move the changing magazine into its defined catch position in a precisely reproducible manner by overcoming the frictional forces. In this connection, the driving motor need only move the changing magazine out of its former catch position (against the retaining force of the catch mechanism) and guide it into the capture area of the target position.

For fast switching, the inert mass of the changing magazine must be sufficiently braked again when reaching the target position so that it comes to a stop as smoothly as possible in the catch and does not carry out an undesirable pendulum movement or even overshoot the target.

In the simplest case, the braking is caused by the mechanical friction of the gear unit after switching off the motor with no load. In an advantageous manner, the electromagnetic braking action of the driving motor is used additionally by electrically short-circuiting the driving motor. It is also possible to actively apply an opposite current pulse to the motor; but this heavily loads the motor and power supply and is difficult to apportion so as not to excite an opposite pendulum movement.

Previously known solutions provide transmitters which signal at the desired target position when the capture area is reached in order to turn off the drive and trigger the braking process. Additional transmitters can be used in order to distinguish between the individual catch positions in a definite manner by means of absolute coding so as to avoid stopping at and counting off the catch positions when initializing.

When the braking process is not triggered until the signaling of the transmitter in the capture area of the catch device, a high braking force is required because of the inertia of the changing magazine, subjecting the driving means to heavy electrical and mechanical stress which can cause troublesome vibration of the entire device. When the traveling speed is too great in proportion to the available braking force, the consumption of movement energy causes unwanted pendulum movements (rebounding or bouncing) in the capture area of the catch mechanism which retard the swinging-in process until the system is stabilized or can even cause the magazine to spring out of the capture area again. Therefore, the available braking force and the capture area define the permissible traveling speed and determine the total duration of the actual exchange and of the subsequent stabilization (swinging-in process). In many applications, a fast change process decisively influences the running time and cycle rate.

OBJECT AND SUMMARY OF THE INVENTION

It is the primary object of the invention to maintain the lowest possible technical expenditure on the driving means, catch mechanism and sensors while realizing high traveling speeds.

The obvious solution, i.e., to expand the capture area of the catch mechanism and thus move up the signaling caused by it, is confined by technical limitations because the catch mechanism has only a limited energy accumulator which must develop adequate force over the entire length of the capture area to guide the changing magazine securely into its defined position against all friction forces, also without a motor drive (spring energy=integral of spring force x path over the capture area).

A broadening of the catch signal alone, so that the transmitter responds already before the capture area is reached, is problematic because an impermissible state can come about when the magazine remains stuck in an undefined intermediate position outside of the capture range but the transmitter signals a locked-in status. The catch signal should therefore be active only inside the capture area of the catch.

The invention meets the above-described object by combining the simple principle of a catch with a forward-looking operation having a determined traveling speed profile along path v(x) which can be determined beforehand corresponding to the catch positions $x_i$ which are assumed to be known. Accordingly, the braking process can be initiated already before reaching the capture area, that is, before the catch signal is initiated. In contrast to the free positioning with a stepping motor or position-regulated driving means, no particular precision is required because the capture area of the catch mechanism is capable of compensating for greater tolerances.

BRIEF DESCRIPTION OF THE DRAWINGS

In the drawings:

FIG. 2a shows the time curve of the digital catch signal of transmitter $s_R(t)$;

FIG. 2b shows the time curve of the electric control voltage for the driving motor U(t); and FIG. 2c shows the resulting time curve of the movement speed of the magazine v(t).

DESCRIPTION OF THE PREFERRED EMBODIMENTS

Figure 1:
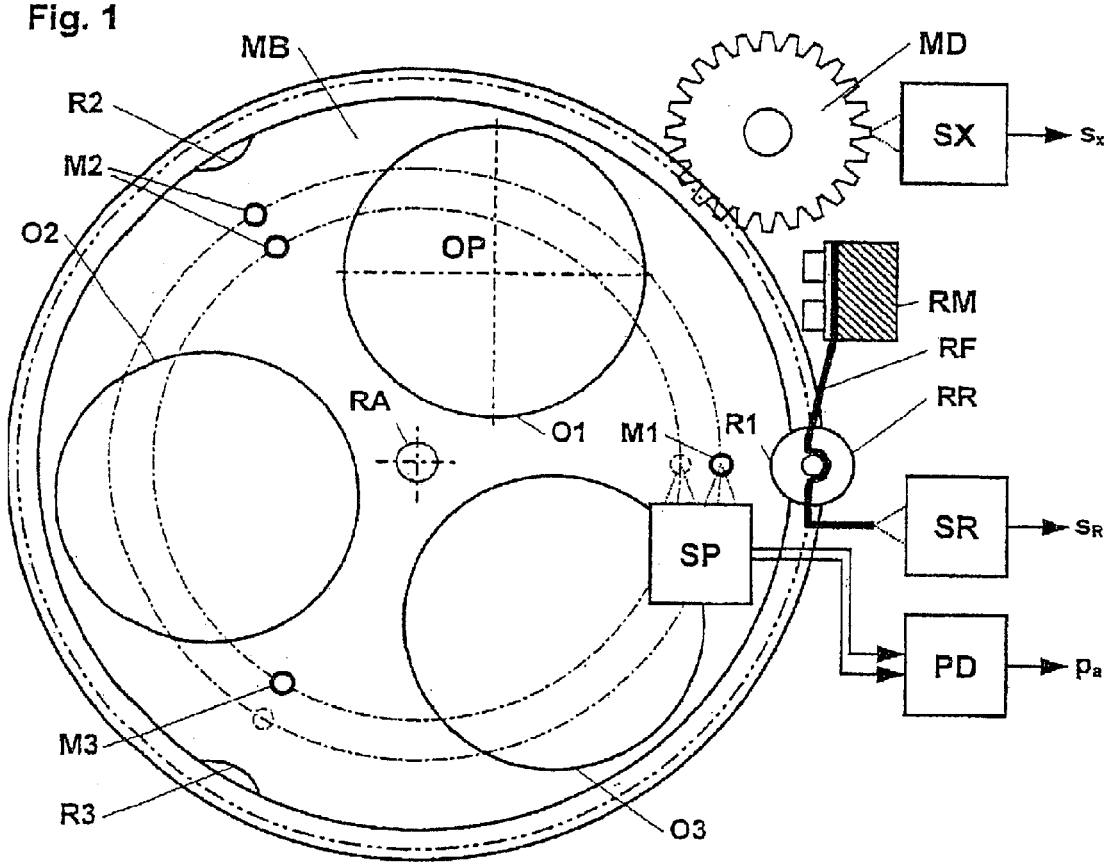
FIG. 1 shows a changing turret or nosepiece magazine by way of example.

As shown in FIG. 1, the changing nosepiece magazine comprises a magazine body MB which is mounted so as to be rotatable about axis RA and which in the present example has three objects 01 . . . 03 such as objectives or fluorescence splitter cubes which can be alternately rotated into the object position OP, a motor drive MD with optional path sensor or speed sensor SX which supplies a path-dependent or speed-dependent signal $S_x$, a catch mechanism RM which in the present example comprises a running roller RR against which the catch spring RF presses so that it engages in one of the catch recesses R1 . . . R3 of the magazine body, with an optional catch sensor SR which signals entry into the capture area of the catch position, e.g., in that when the spring is lifted a light barrier triggers a signal indicating entry into the capture area, a position detecting arrangement comprising a sensor system SP, e.g., Hall sensors, and a decoding device PD which detects the currently adjusted catch position $p_a=1$ . . . 3 based on markers M1 . . . M3 comprising magnets, for example, on the magazine. Either two magnets are provided on the two tracks shown in the drawing or one magnet is provided on one or the other track so as to enable definite acquisition of the position relative to the markers M1–M3.

The changing process can be divided into the following phases:

1. unlock or release phase until exiting from the capture area,
2. acceleration phase,
3. movement phase (in which intermediate positions are possibly skipped over without stopping);
4. braking phase (terminates in the capture area of the target position);
5. lock-in or catch phase (by means of the catch mechanism when the drive is switched off).

When changing to a neighboring position, the movement phase can also be omitted, so that the acceleration phase passes directly into the braking phase. The following principles are taken into consideration for controlling these phases with a determined speed profile along path v(x):

1. Direct control of the operation by a stepping motor whose speed varies with the step frequency over the position. For the catch phase, the stepping motor is switched to an idling state, so that exact positioning is carried out by the catch mechanism. This constitutes an essential difference relative to the conventional free positioning by means of a stepping motor which must actively maintain the target position. In contrast to the latter, requirements with respect to step resolution of the motor are low; also, exact, absolute referencing which would otherwise be required when putting into operation can be dispensed with.
2. Control of the operation based on a path measurement at the driving motor or at the changing magazine itself. In any driving motor, the path measurement can be carried out by a tachometer transmitter by integrating the speed measurement value. Exact path measurement is supplied by a digital incremental transmitter but, in contrast to a conventional drive with position feedback, no costly quadrature encoder is required; rather, a simple, single-phase pulse generator with low resolution is sufficient for generating meter or counting pulses. With suitable DC motors, the current surges caused by the commutator can be evaluated directly for this purpose.
3. A brushless motor can also be used in a similar manner, wherein the path that is traveled can be determined by counting the control or drive phases.
4. Marking: Finally, the time $t_v$ for initiating the pre-braking phase can be determined by means of an additional transmitter which supplies a signal at the correspondingly determined and marked magazine position $x_v$. Accordingly, the start of the pre-braking phase is more precisely determined compared to the strictly time-dependent control with a delay interval $t_{AV}$ described above in 1. This additional transmitter can preferably also be used at the same time for coding to distinguish between the catch positions in a definite manner (static detection with a plurality of transmitter channels for a parallel code or dynamic detection by means of a serial code with an individual transmitter).
5. "Analog transmitter": the path position is determined by a transmitter which supplies a position-dependent analog signal (e.g., potentiometer, inductive, capacitive or optical transducer, possibly with mechanical transposition for adapting the measurement range, e.g., cam disk)
6. Strictly time-dependent control of the operation, wherein the speed profile v(x) over path x(t) is replaced by a time function v(t). The speed profile v(t) is then designed in such a way that its integral over time corresponds precisely to the path length to be traveled from the exited catch to the capture area of the target position. In a DC motor with a hard speed-torque characteristic line (v approximately proportional to U), the speed can be controlled in a simple manner by means of the drive voltage U(t), e.g., by amplitude modulation or pulse width modulation. In case the supply voltage which is taken as a basis for this purpose undergoes extensive fluctuations, it can be measured in order to adapt the time scale in a corresponding manner. The speed can also be directly Control without Sensor Feedback Another particularly inexpensive construction can also dispense with the catch sensor entirely when the path control is sufficiently precise to land reliably directly within the capture area of the target catch position also without feedback by means of the transmitter signal (e.g., when driven by a stepping motor). In this case, there is only a final braking phase and the movement sequence starts immediately when the motor is turned on and comprises the release process and acceleration phase. In this connection, it may have to be taken into account that an individual change is only possible in a limited range of neighboring positions because a catch process must be carried out after a certain traveling distance in order to compensate for accumulated tolerances. Therefore, this construction can be made use of when there is a small quantity of catch positions or when it is sufficient to change from one position to the next position only by steps. Also, however, when a transmitter for feedback is dispensed with entirely, initialization after switching on can only be carried out either by moving blindly (carefully) toward a mechanically defined end position (an end stop in the case of a linear slide or an angle stop in the case of a rotating nosepiece without path optimization) or by an externally controlled adjustment process, e.g., manually by the user or by other automatic devices (robots).

1 Two-phase Braking Process with Catch Sensor

The braking process comprises pre-braking, which starts before the capture area is reached and is controlled by the path, and a concluding catch braking which is initiated exactly in the capture area by the transmitter signal.

Figure 2:
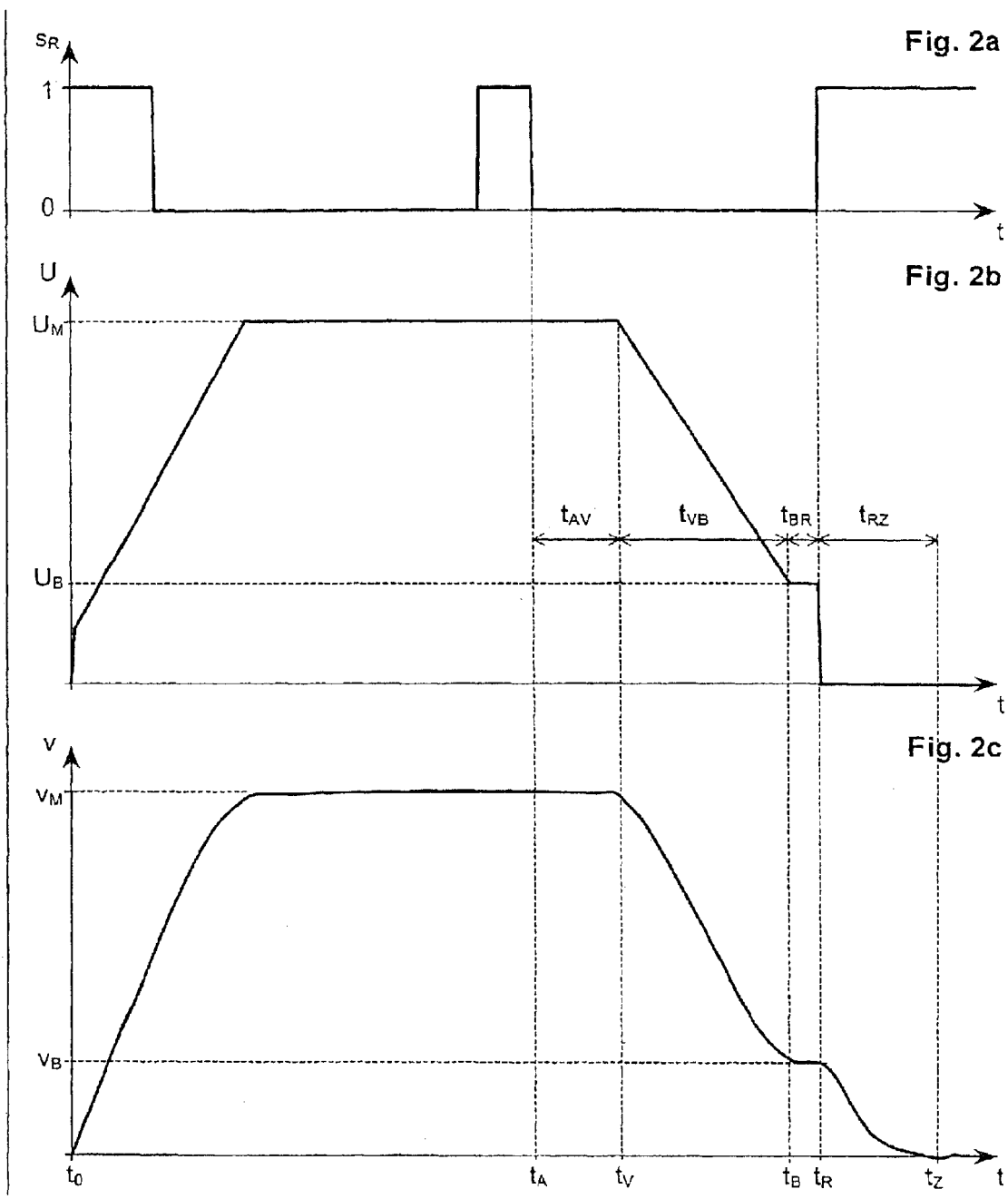
FIG. 2 shows the time curve of a movement operation with a position detecting arrangement and catch sensor as typical signal shapes for changing between two catch positions, for example, the first catch position being skipped over without stopping so as to reach the second as target.

According to FIG. 2, the movement operation v(x) can be controlled over the duration of the movement v(t) by the drive voltage U(t) of a DC motor with a hard speed-torque characteristic (v is proportional to U). The operation is started at time $t_A$ by the transmitter signal which is caused by the catch preceding the desired target position, wherein the path length expected to be traveled from that catch is known beforehand. After a suitably defined delay period $t_{AV}$, the pre-braking phase starts, wherein the drive voltage is reduced to the value $U_B$ until time $t_B$, so that a corresponding residual speed $v_B$ is adjusted. As soon as the catch signal is initiated at time $t_R$, the normal catch braking is triggered (preferably by short circuiting the driving motor).

The voltage value $U_B$ and residual speed $v_B$ are so dimensioned that the catch braking ideally proceeds precisely without a pendulum movement. Delay $t_{AV}$ and pre-braking phase $t_{VB}$ are designed in such a way that they are concluded at the shortest possible time before the catch signal is initiated. The time interval $t_{BR}$ between the end of the pre-braking phase and the start of catch braking spans possible tolerances in the movement process and should be no longer than necessary. The function is also ensured up to a certain degree in case the catch signal should be initiated already at time $t_R$ before the pre-braking phase has completely finished due to unfavorable tolerance shifts. The catch braking would then start already at a somewhat greater residual speed, so that a slight overshoot or overswing which is still within permissible limits can occur.

The speed profile when changing from one catch to the immediately following catch differs from the speed profile when skipping over one or more intermediate positions due to the initial acceleration, so that at least different delay intervals $t_{AV}$ must be determined for this purpose. The same applies to possible differences in the distance between the individual catch positions.

Position Coding as Catch Sensor

Previously, besides Hall sensors for coding the positions, a light barrier was used in addition as a catch sensor which signals when the catch recess is reached within a small tolerance range. Its purpose was primarily to ensure the validity of the bit coding because the Hall sensors switch at somewhat different times within a wider range or tolerance. However, with the "forward-looking" operation, taking into account the known arrangement of positions, it is already determined from the start whether a stop is to be made in the next respective catch position or whether that position will be skipped over. Accordingly, the determination of the bit code serves, if need be, to verify the position, which can also be carried out after swinging in or after skipping over. This makes it possible to economize on additional catch sensors.

Basic Principle

1. A catch position is considered to be reached as soon as only one of the sensor channels gives a signal. It is considered that the catch position has been exited after a fixed period of time or when the debounced sensor signal has dropped off again on all channels (drawing: OR-gated sensor signals+debounce filter). The code word "null" identifies the released state (with n binary sensor channels, a maximum of $2^n-1$ positions can be coded in this way).
2. After locking into the catch position, the bit code is valid after a debounce period which is determined in such a way that a possible pendulum movement in the catch has decayed to the extent that the position remains safety in the stable response range of the sensors.
3. In order to determine the position code even when skipping over the catch (e.g., for redundant verification of the operation), the sensor channels can be repeatedly queried cyclically and the time sequence can be OR-gated for each individual sensor channel, so that it can be determined after several cycles whether or not its code bit was signaled.

Radius Problem and Groups with Different Effective Ranges

1. In the case of rotary changing magazines, the code sensors are to be arranged on a sufficiently large radius so that the difference in the response angle between the inner and outer sensors is not too great. When the number of positions is less than the number of possible code words, the innermost sensors (or a plurality m of innermost sensors) can be excluded from the OR operation for the catch signal, where only $2^m-1$ code words, in which none of the remaining bits is set, need be omitted. Alternatively, known and reproducible differences in the response angle can be compensated by time periods which are correspondingly adapted in a position-dependent manner until the pre-braking phase is triggered.
2. Insofar as the response range of the sensors for the different positions is sufficiently constant, the time period preceding the triggering of the pre-braking phase can be measured from the time point at which the OR-gated sensor signal drops off (=catch exited). The influence of different acceleration behavior (e.g., depending on motor temperature) is accordingly suppressed during release. On the other hand, in case the response range of the sensors is less constant than the acceleration behavior, it is more advantageous to measure after the switch-on time during release. When a catch is skipped over, the measurement point can be averaged between the times of initiation and drop-off of the signal.

Other uses

The principle is not limited to electrically driven changing magazines, but can also be applied, e.g., to pneumatic, hydraulic or combined electropneumatic, electrohydraulic or other linear or rotary driving techniques.

Application is not limited to the positioning of optical elements in the beam path; rather, it extends to any objects in the changing magazine which are to be positioned quickly and precisely, e.g., mechanical or electrical switching devices, measuring heads, tools, gears, shaping elements, nozzles or the like.

Advantages

Greater traveling speed and shorter swing-in periods allow faster changing, particularly also over a plurality of positions;

reduced electrical and mechanical strain on the drive and catch mechanism prolong useful life;

reduced loading of the power supply and improved suppression of electrical interference pulses (EMV);

prevention of mechanical vibrations and noise;

harmonically smooth changing process, elegant overall visual and acoustic impression conveying high precision;

cost saving.

While the foregoing description and drawings represent the present invention, it will be obvious to those skilled in the art that various changes may be made therein without departing from the true spirit and scope of the present invention.

What is claimed is:

1. A method for controlling a changing magazine for microscopes with two or more determined changing positions comprising the steps of:

using a motor drive and a mechanical catch mechanism which causes an exact positioning in the respective catch position within a certain capture area; and controlling the speed of the changing movement v(x) in such a way that an elongated approach ramp and/or braking ramp results and the catch position to be moved toward is reached at a low residual speed.

2. The method according to claim 1, wherein driving is carried out by a stepping motor and the path position results from the number of steps traveled.

3. The method according to claim 1, wherein the path position is determined based on counting pulses in determined path increments.

4. The method according to claim 3, wherein a transmitter supplies counting pulses, wherein driving is carried out by a brushless motor whose control phases are evaluated as counting pulses.

5. The method according to claim 3, wherein driving is carried out by means of a DC motor and the current surges caused by the commutator are evaluated as counting pulses.

6. The method according to claim 1, wherein there is a sensor which signals the passage of individual path segments or path positions (=reference points of the speed profile v(x)) which determine the movement operation and which are distinguished by marks.

7. The method according to claim 6, wherein there are a plurality of sensors, each of which signals determined path segments marked in the corresponding channel.

8. The method according to claim 6, wherein a transmitter preferably supplies a short pulse when the position is passed.

9. The method according to claim 6, wherein one or more transmitter signals in determined combinations mark individual areas between two positions.

10. The method according to claim 1, wherein the path position is determined by a transmitter which supplies a position-dependent analog signal.

11. The method according to claim 10, wherein a potentiometer or inductive, capacitive or optical transducer is provided.

12. The method according to claim 10, wherein the respective path position directly influences the speed profile in the manner of a cam disk which controls the driving motor, for example.

13. The method according to claim 1, wherein the path position is determined approximately based on the traveling time when the speed is approximately known, so that the speed is ultimately controlled over time as profile v(x(t))=v(t).

14. The method according to claim 1, wherein there is a transmitter which signals when a catch position is reached.

15. The method according to claim 14, wherein the braking process is divided into pre-braking before the target position is reached and catch braking which is triggered by the transmitter signal in the capture area of the catch.

16. The method according to claim 1, wherein the pre-braking is controlled by a time function which starts with a suitably determined delay time after the catch signal which precedes the target position.

17. The method according to claim 1, wherein the pre-braking is triggered by a transmitter signal at a determined position.

18. The method according to claim 1, wherein driving is carried out by an electric motor whose speed profile v(x) is controlled by the driving voltage U(x) or U(t).

19. The method according to claim 1, wherein the motor voltage is controlled by pulse width modulation by the pulse width repetition rate.

20. The method according to claim 1, wherein the motor voltage is measured as an essential influencing variable and is utilized for accurate calculation of the resulting motor speed with corresponding correction of the time sequence or is readjusted for correcting the resulting motor speed.

21. The method according to claim 1, wherein the operating voltage taken as the basis of a pulse width modulation or a linearly controllable voltage reduction is measured.

22. The method according to claim 1, wherein the average driving voltage actually applied to the motor is measured.

23. The method according to claim 1, wherein the motor current is turned off briefly at determined times in order to measure the actual traveling speed based on the generator voltage when idling.

24. The method according to claim 1, wherein the actual path length or time period between the signals of the distinguished path positions or catch positions is measured and is utilized as a reference quantity for calibrating the path scale or time scale for subsequent movements.

25. A changing magazine comprising:

two or more determined changing positions;

a motor drive;

a mechanical catch mechanism which causes an exact positioning in the respective catch position within a certain capture area; and sensors which serve for definite acquisition of the positions marked by code and simultaneously due to the presence of the mark at a determined position for controlling the changing movement.

* * * * *